United States Patent [19]

Nixdorf

[11] Patent Number: 4,875,616
[45] Date of Patent: Oct. 24, 1989

[54] METHOD OF PRODUCING A HIGH TEMPERATURE, HIGH STRENGTH BOND BETWEEN A CERAMIC SHAPE AND METAL SHAPE

[75] Inventor: Richard D. Nixdorf, Knox County, Tenn.

[73] Assignee: America Matrix, Inc., Knoxville, Tenn.

[21] Appl. No.: 230,452

[22] Filed: Aug. 10, 1988

[51] Int. Cl.$^4$ .................. B23K 20/00; B22D 19/04; B22D 19/14

[52] U.S. Cl. .................. 228/120; 228/122; 228/124; 228/176; 228/234; 228/253; 228/263.12; 164/97; 164/111; 29/156.5 R; 419/8

[58] Field of Search .......... 228/120, 122, 124, 176, 228/189, 234, 253, 255, 263.12; 164/97, 111; 29/156.5 R; 419/8, 10

[56] References Cited

U.S. PATENT DOCUMENTS

| | | | |
|---|---|---|---|
| 4,055,451 | 10/1977 | Cockbain et al. | 228/120 |
| 4,075,364 | 2/1978 | Panzera | 228/120 |
| 4,254,621 | 3/1981 | Nagumo | 164/97 |
| 4,338,380 | 7/1982 | Erickson et al. | 228/120 |
| 4,404,262 | 9/1983 | Watmough | 29/156.5 R |
| 4,735,128 | 4/1988 | Mahrus et al. | 29/156.5 R |

Primary Examiner—Nicholas P. Godici
Assistant Examiner—Samuel M. Heinrich
Attorney, Agent, or Firm—Pitts and Brittian

[57] ABSTRACT

A method for producing a high temperature, high strength bond between a ceramic shape and a metal substrate, such as joining a ceramic cap to a piston for an internal combustion engine. The composite joint is effected through the use of a ceramic preform fabricated using fibers, whiskers, platelets or sponge-like particles having the same composition as the ceramic body. The preform is joined to the ceramic shape by using a ceramic slip having a ceramic corresponding in composition with the ceramic body, with this juncture being heated to achieve a secure bond. The preform is joined to the metal substrate by first infiltrating the preform with molten material corresponding to the substrate, and then pressure bonding the infiltrated preform to the substrate after the molten material has solidified. The substrate can be metal or metal alloys. An example is given for the bonding of silicon carbide to a 300 series aluminum.

9 Claims, 1 Drawing Sheet

U.S. Patent         Oct. 24, 1989         4,875,616

METHOD OF PRODUCING A HIGH TEMPERATURE, HIGH STRENGTH BOND BETWEEN A CERAMIC SHAPE AND METAL SHAPE

TECHNICAL FIELD

This invention relates generally to the bonding of a ceramic member to a metallic substrate, and more particularly to an improved method for producing a high temperature, high strength bond between preshaped units of these compositions.

BACKGROUND ART

In the art of advanced high temperature internal combustion engines, studies include having a ceramic cap overlaying the metallic piston so as to protect the piston from the temperature of the burning fuel. This will require a method for adequately bonding the ceramic to the metal such that a high strength joint results. In a similar manner, a high strength bond is required between a ceramic and metal where the metal serves as a heat sink for a rocket nozzle. These are just a few examples of the need for a ceramic-to-metal bond.

The joining of such dissimilar materials has conventionally been accomplished by one of several methods. For the ceramic-metal systems, the conventional joining methods include mechanical fasteners, metal brazing, epoxy resins and epoxy glass bonds. While these methods are adequate for low temperature, low stress applications, they do not produce the type of bond needed for the high temperature, high stress applications as illustrated above. For example, the large difference in coefficients of thermal expansion cause rupture of mechanical joints. Most braze materials melt at about 900 degrees C. The organic-type (resin) epoxy bonds degrade at relatively low temperatures, and some of the bonding materials (e.g., epoxy glass bonds) react chemically with the base materials as the temperature is increased.

Thus, it is a principal object of the present invention to provide an improved method of joining a ceramic shape to a metallic shape.

It is another object to provide a method of joining a ceramic to metallic shape to overcome thermal expansion mismatches between the ceramic and the substrate.

It is also an object of the present invention to provide a bond between a ceramic shape and a metallic shape that eliminates chemical incompatibility among the components.

A further object of the invention is to provide a method for joining a ceramic shape to a metallic shape wherein the weakest portion of the resultant joint is equal to the strength of the weaker material being bonded.

These and other objects of the present invention will become apparent upon a consideration of the following drawings and a detailed description thereof.

DISCLOSURE OF THE INVENTION

In accordance with the present invention, a composite is formed having a first body of a ceramic material and a second body or substrate of a metal, metal alloy or the like. As used hereinafter, the term "substrate" refers generically to the body or shape to which the ceramic is bonded. This composite also contains an intermediate preformed structure containing compacted ceramic whiskers, platelets or the like (of the same ceramic material). Bonding of the preform of ceramic whiskers, etc., to the ceramic shape is achieved using a slip casting slurry of highly sinterable, finely divided ceramic of the same material as the shape. The preform of the ceramic whiskers, etc., is bonded to the metal or matal alloy shape by impregnating the same with a castable metal or metal alloy of the same material. Final formation of the composite is accomplished by a high pressure, high temperature step to ensure a complete bond between the ceramic and the metal.

BEST MODE FOR CARRYING OUT THE INVENTION

Figure 1:
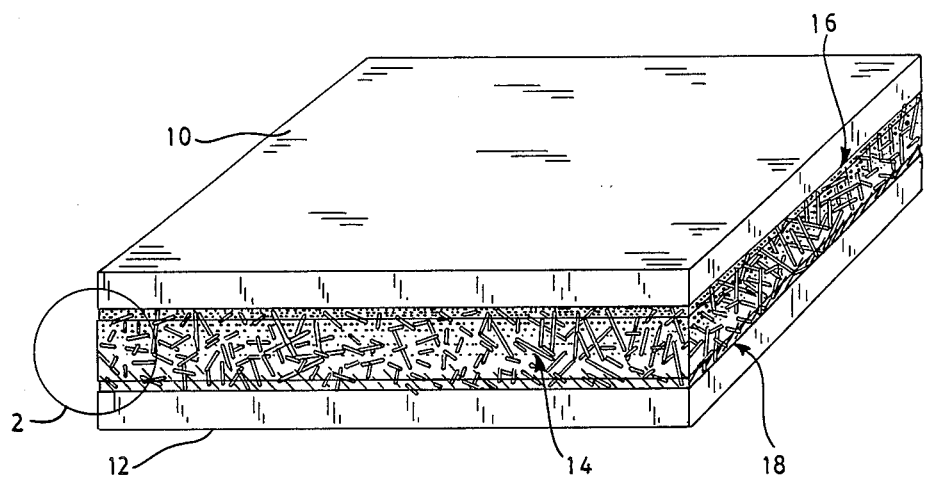
FIG. 1 is a drawing illustrating a composite body fabricated using the present invention. In this figure, the intermediate structure is exaggerated so as to better illustrate the structure.
Figure 2:
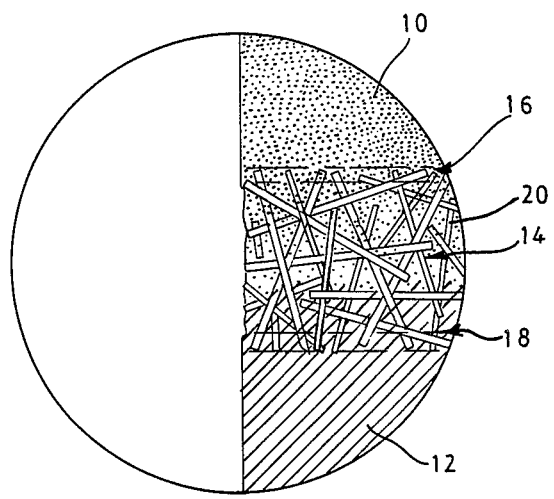
FIG. 2 is an enlarged cross-sectional drawing of a structure achieved using the present invention, with this cross section taken at the circled area 2 of FIG. 1.

The present invention, particularly as applied to the bonding of a ceramic body 10 to a metal body 12, is illustrated in the two figures. The particular ceramic body 10 is not limited; rather, a suitable ceramic can be one of several carbides, nitrides or oxides. This will include, for example, aluminum oxide, zirconium oxide, boron carbide, boron nitride, silicon carbide, silicon nitride, silicon dioxide, titanium diboride, titanium carbide, titanium nitride, zirconium diboride, zirconium carbide, hafnium carbide or appropriate mixtures thereof. The metal body 12 is any suitable structural material, for example, such as iron, iron alloys, aluminum, aluminum alloys and the like. The composite structure has an intermediate layer 14, the composition of which is described hereinafter. This intermediate layer 14 is joined to the ceramic body 10 with a first interface composition 16, and to the metallic body with a second interface composition 18.

The intermediate layer 14 is predominantly a premolded preform of ceramic fibers, whiskers, platelets or sponges 20 of the same composition as the ceramic body 10. The preform has a void volume to accept infiltration and a strength sufficient to withstand infiltration pressures as discussed below. This intermediate layer 14 is joined to the ceramic body 10 at the first interface 16 by coating the affronting face of the ceramic with a slurry of high sinterable fine particle size ceramic of the same type being joined whereby this slurry receives the face of the preform. This structure (ceramic body, ceramic slurry and preform) is heated to a temperature sufficient to recrystallize the ceramic of the slurry to thus bond the preform 14 to the ceramic body 10 at the first interface 16.

Subsequently, the opposite face of the preform 14 is impregnated with a metal of the type to be joined. This is accomplished by "squeeze" or pressure casting so that any portion of the preform not occupied by the recrystallized ceramic slurry material is filled with the metal. After removing excessive metal to the ceramic preform surface, the metal shape 12 is then pressure bonded to create the interface 18 and thus the composite structure.

The present invention, as discussed above, is typically suitable for bonding a 100% dense silicon carbide ceramic piston cap to a 300 series castable aluminum alloy piston. Such a structure is considered for use in an internal combustion engine. For this application, the cap element is formed by hot pressing fine silicon carbide powder at a temperature of about 1900 degrees C. One surface is formed to produce the combustion-side face, and the opposite face is flat. This flat face is then ground to, for example, a thirty-two microinch finish.

A ceramic preform for the intermediate layer is produced from single crystal silicon carbide whiskers of about 1-3 microns in diameter and about 50-150 microns in length as produced by conventional processes known to those versed in the art. These whiskers are compacted using vibratory methods so as to fill a graphite die to a thickness of about ⅜ inch. The diameter of the die is the same as the diameter of the piston. This compacted mass of silicon carbide whiskers is sintered in the die at about 2100 degrees C. for about two hours. This is followed by a grinding of the opposite faces so as to be flat and parallel.

A ceramic slurry or slip is produced using the same silicon carbide particles as used to produce the ceramic body. This slip is made using acetone, about five percent phenolic resin and about one weight percent boron carbide. Approximately a ⅛ inch layer of the ceramic slip is applied to the flat face of the ceramic body, and the ceramic preform is pressed into this slip layer and weighted with, for example, a graphite block. The composite silicon carbide shape, slip and preform are then heated at about 2200 degrees C. in an inert atmosphere for about four hours. (Other time/temperature conditions may be required for applications of the invention to other ceramic materials.)

The composite resulting from the above joining of the preform to the ceramic body is placed in a press with the uncoated face of the preform exposed upwardly. A quantity of molten 300 series aluminum is then poured onto the preform, the amount being sufficient to provide about 0.1 inch excess above the preform. This is followed by applying the ram of the press to the molten metal with a pressure of about 15,000 psi to achieve full impregnation of the preform with the molten aluminum. Following solidification, excess aluminum is milled from the unit to expose the silicon carbide whiskers.

Following the polishing of the aluminum face of the preform and the face of the piston to assure fully flat and clean surfaces, the cap unit (ceramic shape with bonded preform) is bonded to the piston top by pressure bonding under conditions to form a sound metallurigical bond between the piston and the cap. If necessary or desirable, peripheral surfaces can be milled or polished to achieve proper fit of the composite piston within an engine cylinder.

From the foregoing, it will be recognized by those versed in the art that a method of achieving a high bond strength join of a ceramic body or shape to a substrate metallic shape is achieved. When a ceramic is joined to a metal, the joined unit can be used under high stress and high temperature (above about 500 degrees C.) conditions. This is made possible by the development of ultra-high strength ceramic whiskers, platelets and fibers which can be produced on a volume basis, and their use in a sintered preform. Using conventional infiltration processes and diffusion bonding, a structure is created as a buffer for the transfer of incompatible properties such as thermal expansion, plastic modulus, yield strength, toughness, etc. The intermediate layer has mechanical properties superior to those of either of the materials being joined.

Although the method is illustrated with only a limited number of materials, there is no intent to limit the invention by these illustrations. Rather, the invention is to be defined by the appended claims and their equivalents when taken together with the detailed description of the invention.

I claim:

1. A method for producing a high temperature, high strength bond between a ceramic body and a metal substrate, which comprises the steps of:
   producing a volume of consolidated particulate single crystals of a selected shape of a composition matching said ceramic body, said particulate shape selected from whiskers, fibers, platelets and sponges;
   sintering said volume of consolidated single crystal particulate shapes to form a high strength preform;
   grinding a first surface of said preform to a contour to substantially conform to a selected surface of said ceramic body;
   grinding an opposite face of said preform to substantially conform to a selected surface of said metal substrate;
   coating said selected surface of said ceramic body with a ceramic slip formed from fine ceramic particles, of a composition matching said ceramic body, in an organic liquid phase;
   pressing said first face of said preform into said slip coating;
   heating said ceramic body, said slip coating and said preform under time/temperature conditions to sinter said preform to said ceramic body;
   covering said opposite face of said preform with molten material of a composition corresponding to that of said metal substrate;
   pressing said molten metal material into said preform and allowing said molten material to solidify; and
   pressure bonding said metal substrate to said solidified material to thereby achieve said joining of said ceramic body to said metal substrate.

2. The method of claim 1 further comprising, prior to said pressure bonding step:
   removing excess solidified metal material to expose said selected particulate shapes of ceramic crystals of said preform; and
   polishing said surface of said preform after said removal of excess solidified material, and said selected surface of said substrate.

3. The method of claim 1 wherein said ceramic body is selected from oxides, nitrides, carbides and borides, and said substrate is selected from metals and metal alloys.

4. The method of claim 1 wherein said ceramic is silicon carbide, said preform is fabricated of selected particulate single crystal shapes of silicon carbide and said substrate is aluminum.

5. The method of claim 4 wherein:
   said ceramic body is a ceramic cap for a piston of a combustion engine, said ceramic cap having a flat surface to join with said piston;
   said substrate is an aluminum piston having a flat surface to join with said cap; and
   said first and opposite surfaces of said preform are flat and parallel.

6. The method of claim 1 wherein said organic liquid phase of said slip is a mixture of about 5% phenolic resin in acetone, said slip further comprising about 1% by weight of finely divided boron carbide.

7. The method of claim 3 wherein said volume of consolidated single crystal particle shapes are silicon carbide whiskers and said consolidated whiskers are sintered at a temperature of about 2100 degrees C. for about two hours.

8. The method of claim 7 wherein said ceramic body, said slip and said preform are heated in an inert atmoshpere at about 2200 degrees C. for about four hours.

9. The method of claim 3 wherein said substrate is aluminum, and said pressing of said molten material into said preform is accomplished at about 15,000 psi, said method further comprising, prior to said pressure bonding step;

removing excess solidified material from said preform; and polishing said surface of said preform from which said excess solidified material is removed, and said selected surface of said substrate.

* * * * *